United States Patent [19]

Sibold

[11] Patent Number: 4,942,693
[45] Date of Patent: Jul. 24, 1990

[54] PLANT SUPPORTING UMBRELLA

[76] Inventor: Josie Sibold, 1109 E. Dallas Rd., Chattanooga, Tenn. 37405

[21] Appl. No.: 328,319

[22] Filed: Mar. 24, 1989

[51] Int. Cl.⁵ .............................................. A01G 17/06
[52] U.S. Cl. .......................................... 47/44; 47/39; 135/20 R; 211/197
[58] Field of Search ............... 135/20 R, 25 R; 47/39, 47/44; 211/197; 1/119.03, 119.01

[56] References Cited

U.S. PATENT DOCUMENTS

| | | | |
|---|---|---|---|
| 542,821 | 7/1895 | Broughton | 47/44 |
| 1,349,281 | 8/1920 | King | 135/20 R |
| 2,168,188 | 8/1939 | Bernhard | 135/26 |
| 2,465,140 | 3/1949 | Vila | 135/20 R |
| 2,599,513 | 6/1952 | Griffin | 135/20 R |
| 3,374,798 | 3/1968 | Samuelson | 135/20 R |
| 4,101,037 | 7/1978 | Allesch | 211/197 |
| 4,433,699 | 2/1984 | Schultes | 135/20 R |

FOREIGN PATENT DOCUMENTS

| | | | |
|---|---|---|---|
| 425707 | 6/1967 | Switzerland | 211/197 |
| 2156891 | 10/1989 | United Kingdom | 47/44 |

OTHER PUBLICATIONS

Garden Umbrella; Popular Mechanics; July 1952; p. 167, copy in 47/44.

*Primary Examiner*—Henry E. Raduazo
*Attorney, Agent, or Firm*—Robert F. Ziems

[57] ABSTRACT

An adjustable arbor-like umbrella construction is provided by which the umbrella may be adapted to a variety of locations and supports real and/or artificial plants or tree branches in order to provide shade in an aesthetically pleasing manner. In an exemplary embodiment, the umbrella of the present invention includes a center pole, a central hub support atop the pole, and a plurality of lattice assemblies radiating from the support hub and being rotatably attached thereto. Each of the lattice assemblies is formed of a plurality of slats pivotally connected to one another. Since each lattice assembly may be rotated with respect to the support hub and each slat of each lattice assembly may be pivoted with respect to an adjacent slat, the umbrella can be arranged in not only a variety of circular shapes of varying diameter, but also in a multiple of non-circular shapes to accommodate its use, for example, up against a wall, around a corner, in a corner, or to suit a particular taste.

10 Claims, 5 Drawing Sheets

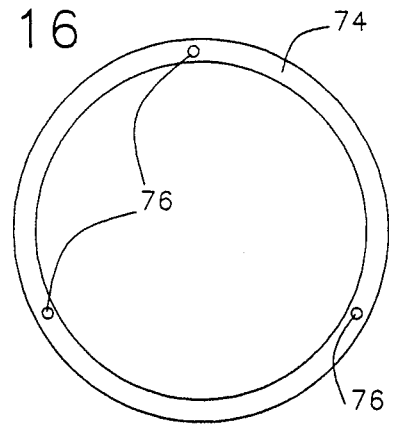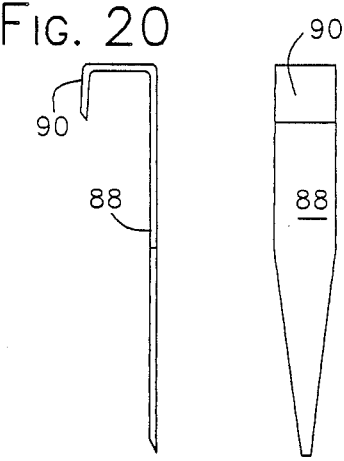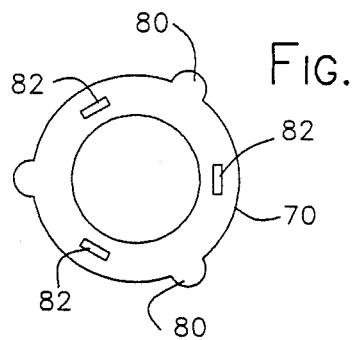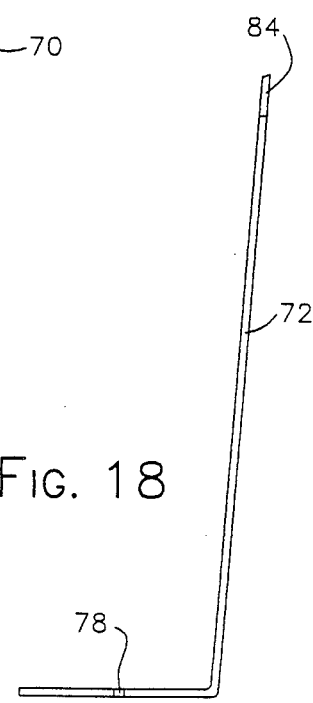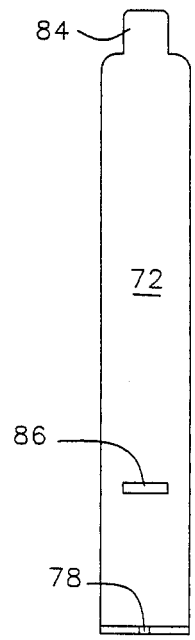

PLANT SUPPORTING UMBRELLA

BACKGROUND OF THE INVENTION

This invention relates to plant supports and, more particularly, it concerns an adjustable arbor or trellis like umbrella construction for supporting real and/or artificial foliage in a variety of configurations.

Canopy or beach umbrellas having a cloth cover supported in a circular convex shape by a plurality of hinged ribs radiating from a center pole which is either placed firmly in the ground or attached especially to a garden or patio table are well known. Such umbrellas work well at providing shade on patios, in gardens, and at recreation areas such as the beach. However, these umbrellas are limited in application by their shape and size and are less than pleasing from an aesthetic point of view.

Arbors having a latticework covered with climbing shrubs or vines and trees which are trimmed so as to provide a canopy of foliage are aesthetically pleasing and provide shade. However, arbors and trees are substantially fixed in location and configuration.

Accordingly, there is a need for an improved umbrella or arbor construction which not only provides shade, but also is highly versatile and pleasing in appearance.

SUMMARY OF THE INVENTION

In accordance with the present invention, an adjustable arbor-like umbrella construction is provided by which the umbrella may be adapted to a variety of locations and supports real and/or artificial plants or tree branches in order to provide shade in an aesthetically pleasing manner.

In a preferred embodiment, the arbor umbrella of the present invention includes a central pole, a support disc atop the pole, and a plurality of lattice assemblies radiating from the support disc and being rotatably attached thereto. Each of the lattice assemblies is formed of a plurality of slats pivotally connected to one another. Since each lattice assembly may be rotated with respect to the support disc and each slat of each lattice assembly may be pivoted with respect to an adjacent slat, the umbrella can be arranged in not only a variety of circular shapes of varying diameter, but also in a multitude of non-circular shapes such as an ellipse, oval, semicircle, heart, etc. to accommodate its use, for example, up against a wall, around a corner, in a corner, or to suit a particular taste.

In accordance with the preferred embodiment, the arbor umbrella of the present invention further includes a hanger bolt extending from the top end of the central pole, through the support disc, and thereabove a sufficient distance to support a leaf keeper disc and a decorative finial between the support member and an acorn nut. A metal ring is added to the lower surface of the support disc in the area of attachment of the lattice assemblies to reinforce the support disc and distribute the load of the lattice assemblies and any foliage added thereto.

Accordingly, a principal object of the present invention is to provide a highly versatile, easily manipulated, arbor-like umbrella for supporting real and/or artificial foliage and, thereby, providing shade in a practical and aesthetically pleasing manner. Another and more specific object of the invention is the provision of an arbor-like umbrella having adjustable foliage supporting elements which accommodate the use of the umbrella in a variety of locations. Other objects and further scope of applicability of the present invention will become apparent from the detailed description to follow taken in conjunction with the accompanying drawings in which like parts are designated by like reference characters.

BRIEF DESCRIPTION OF THE DRAWINGS

FIG. 16 is a top plan view representing the base disk of the umbrella support stand;

FIG. 17 is a top plan view of one of the two stand retainer disks;

FIG. 18 is a side elevation of one of the stand legs;

FIG. 19 is a front elevation of the stand leg of FIG. 18;

FIG. 20 is a side elevation of a stand support stake; and

FIG. 21 is a front elevation of the stake of FIG. 20.

DETAILED DESCRIPTION OF THE PREFERRED EMBODIMENT

Figure 1:
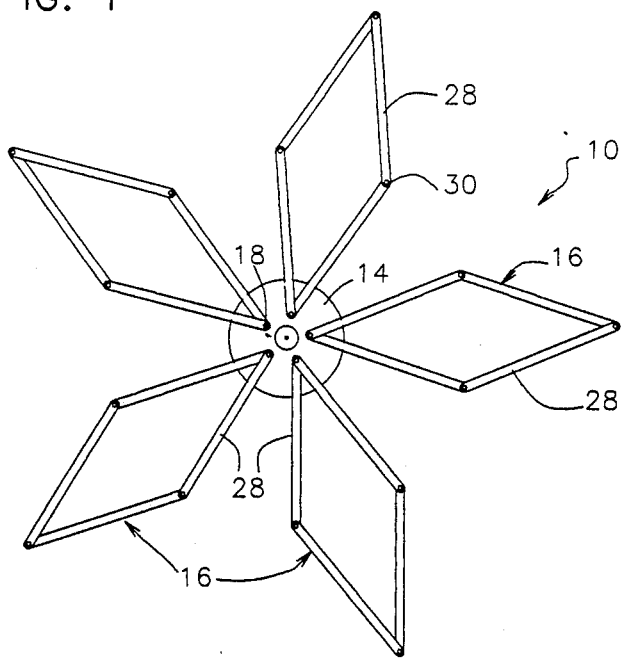
FIG. 1 is a top plan view illustrating the plant supporting umbrella of the present invention with each of the foliage supporting lattice assemblies radiating from the center at equal angles and extending equal distances.
Figure 2:
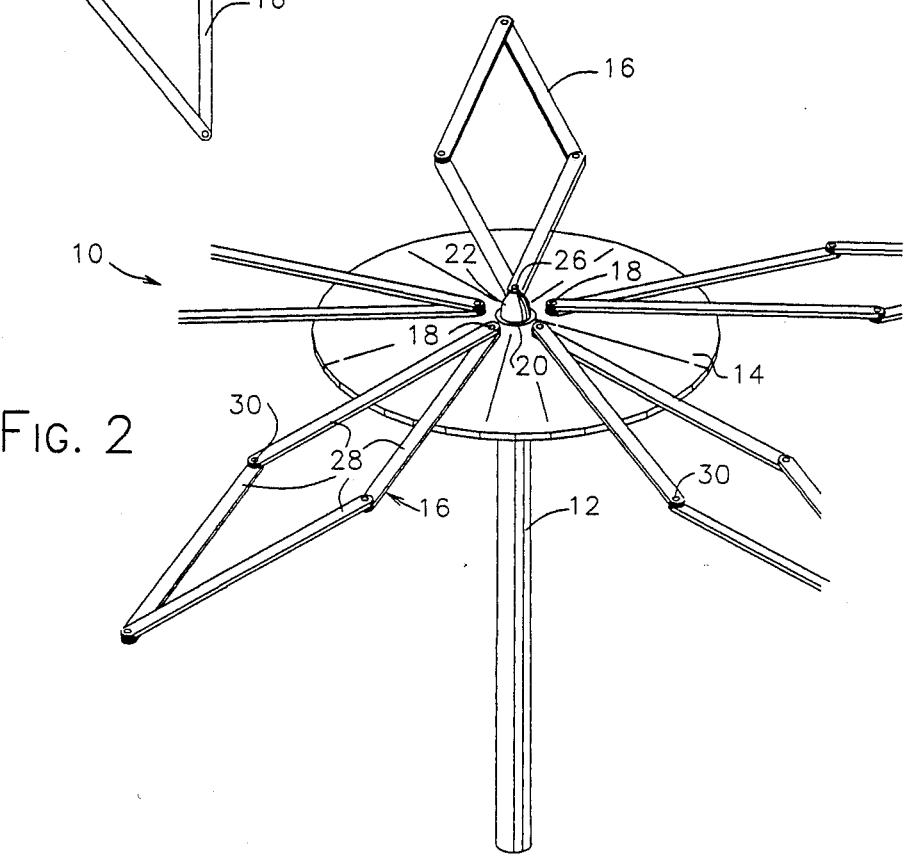
FIG. 2 is a fragmentary perspective view depicting the supporting umbrella of FIG. 1.
Figure 6:
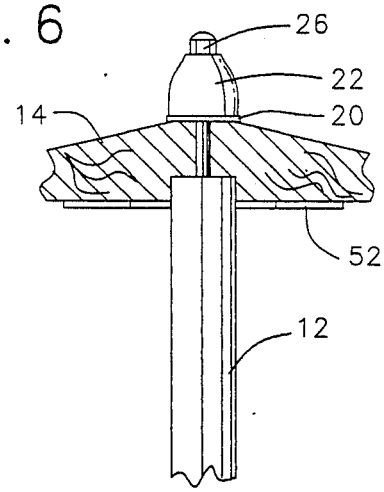
FIG. 6 is an enlarged fragmentary cross-section of the upper of the umbrella of the present invention.
Figure 7:
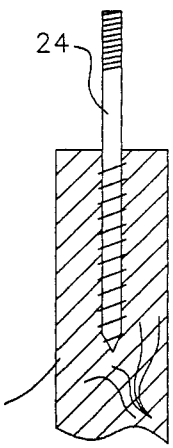
FIG. 7 is an enlarged fragmentary cross-section of the center pole and hanger bolt of FIG. 6.
Figure 11:
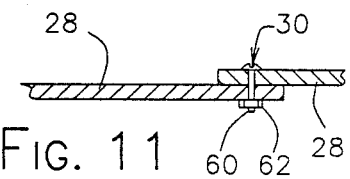
FIG. 11 is a partial side elevation representing the pivotal connection between two slats.
Figure 9:
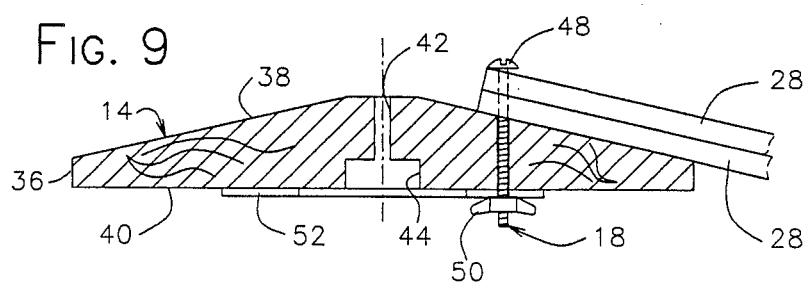
FIG. 9 is an enlarged cross-section of the central support disc on line 9—9 of FIG. 8 together with a reinforcing and a lattice assembly.

In FIGS. 1-2 of the drawings, the umbrella of the present invention is generally designated by the reference numeral 10 and shown to include a center pole 12, a support disc or hub 14 atop the pole, and a plurality of foliage supporting lattice assemblies or spokes 16 radiating from the support disc 14. One end of each of the lattice assemblies is rotatably attached to the support member by a long bolt assembly 18 (FIG. 9). The support disc 14, a leaf keeper disk 20, and a standard finial 22 are secured to the pole 12 by a hanger bolt 24 and an acorn nut 26 (FIGS. 6 and 7). Each of the lattice assemblies 16 includes a plurality of slats 28 of equal length which are pivotally connected to one another by either one of the long bolt assemblies 18 or a short bolt assembly 30 (FIG. 11).

Figure 3:
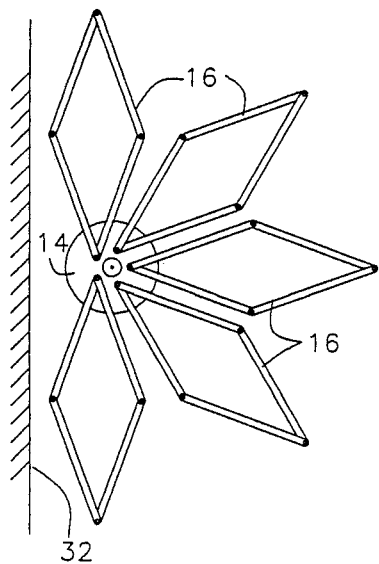
FIG. 3 is a top plan view representing the umbrella of the present invention with the foliage supporting lattice assemblies positioned to accommodate placement adjacent a wall.
Figure 4:
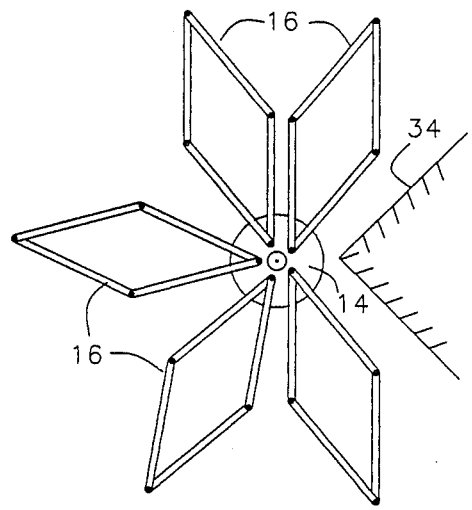
FIG. 4 is a top plan view illustrating the umbrella of the present invention with the foliage supporting assemblies positioned so as to accommodate of the umbrella around a corner.

As shown in FIGS. 3 and 4 of the drawings, the angle at which each of the foliage supporting lattice assemblies 16 radiates from the central support disc 14 can be adjusted by rotating the lattice assembly 16 with respect to the support member 14 on the long bolt assembly 18. In this manner, the umbrella is highly versatile in that it can be placed flat against a wall 32 (FIG. 3) or around a corner 34 (FIG. 4).

Figure 5:
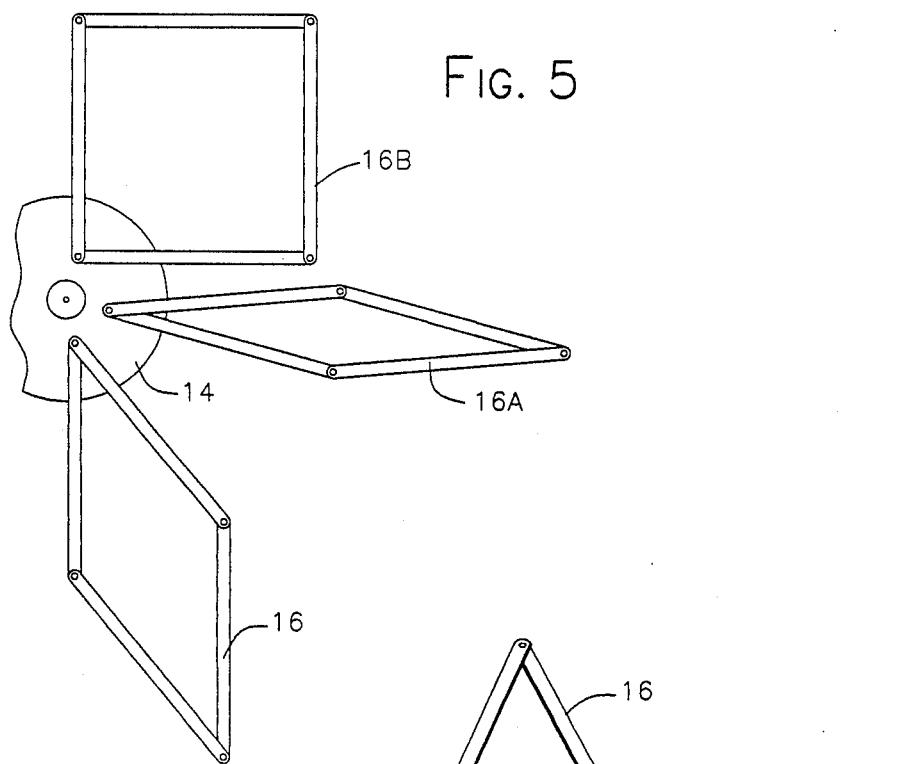
FIG. 5 is a partial top plan view illustrating the umbrella of the present invention with each of the foliage lattice assemblies being adjusted differently.

Moreover, as shown in FIG. 5 of the drawings, each of the slats 28 of the lattice assembly 16 can be angularly adjusted relative one another in order to increase the distance that the lattice element extends from the central support member 14 as shown by the lattice assembly labeled 16A, to decrease the diameter of the umbrella as shown by lattice assembly labeled 16B, to accommodate placement of the umbrella adjacent a wall or in a corner, or to place the umbrella in any one of a multitude of configurations parallelogram desired by the user.

As shown in the exemplary embodiment of FIGS. 1-4 of the drawings, the umbrella 10 includes 5 lattice assemblies 16 each having four slats 28. It is to be understood, however, that the present invention is not limited to a particular number of lattice assemblies or slats therein.

Figure 8:
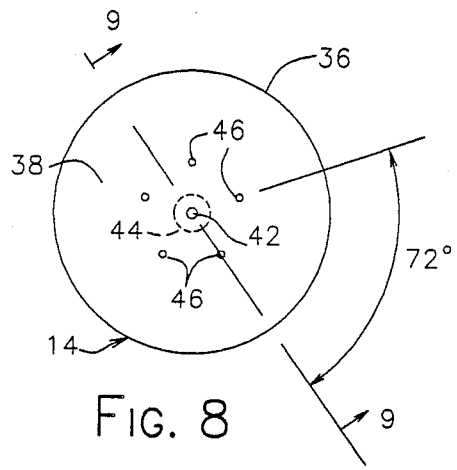
FIG. 8 is a top plan view illustrating the central support disc.

More particularly, as shown in FIGS. 6-9, the central support member or hub 14 is preferably made of wood, such as, mahogany, white oak, poplar, etc. and has a circular outer periphery 36, an angled or frustoconical top surface 38, and a horizontal bottom surface 40. The hub 14 also has a small diameter central through hole 42 which accommodates the hanger bolt 24 and a large diameter bore 44 concentric with the through hole 42 and extending part way through the hub. The large diameter bore 44 provides for the insertion of a top portion of the pole 12 into the hub 14. As such, the bore 44 not only insures proper placement of the pole with respect to the hub, but also provides for added support to maintain the hub 14 perpendicular to the pole 12. The central support disc 14 also includes a plurality of small diameter through holes 46 located at equal radial distances from the center of the hub and separated by equal angles, such as 72° (FIG. 8). These through holes 46 accommodate the long bolt assemblies 18 and thereby provide for attachment of the lattice assemblies 16 to the hub 14. Because of the flat inclination of the frustoconical top surface 38 oft he hub 14 and the connection of the lattice assembly 16 by the bolts 18 inwardly the outer periphery 36 thereof, the lattice assemblies 16 radiate from the hub 14 generally in planes which intersect the axis of the pole 12 at approximately the same large acute angle determined by the inclination of the top surface 38.

Figure 12:
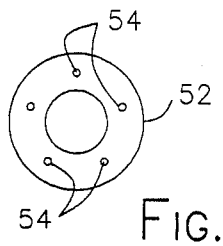
FIG. 12 is a top plan view illustrating the reinforcing ring.

With reference again to FIG. 9 of the drawings, each of the long bolt assemblies 18 includes a bolt element such as a brass round head slotted machine screw 48, and a nut element 50, such as a brass wing nut. A reinforcing ring 52 having a plurality of openings 54 which coincide with the through holes 46 in the hub 14 is added between the nut 50 and the horizontal lower surface 40 of the hub 14 (FIG. 12). The reinforcing ring 52 not only reinforces the hub 14, but also serves to distribute the load applied thereto by the foliage supporting lattice assemblies 16. The reinforcing ring is made, for example, from 16 gage steel which is brass plated.

Figure 10:
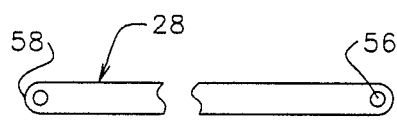
FIG. 10 is a top plan view illustrating one of the lattice assembly slats.

As shown in FIGS. 10 and 11 of the drawings, each of the lattice assembly slats 28 is made of wood, for example, the same wood material as the hub 14 and includes a through hole 56 near each of its rounded ends 58. Each of the short bolt assemblies 30 includes a bolt element 60 such as a brass round head slotted machine screw and a nut element 62 such as a brass lock nut. The through holes 56 in the slats 28 accommodate either the long bolts 48 of the long bolt assemblies 18 or the shorter bolts 60 of the short bolt assemblies 30. Manufacturing an assembly of the present umbrella is facilitated in that each of the slats 28, long bolt assemblies 18, and short bolt assemblies 30 are of identical construction, respectively.

Figure 13:
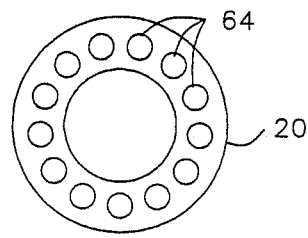
FIG. 13 is an enlarged top plan view representing the keeper disk.
Figure 15:
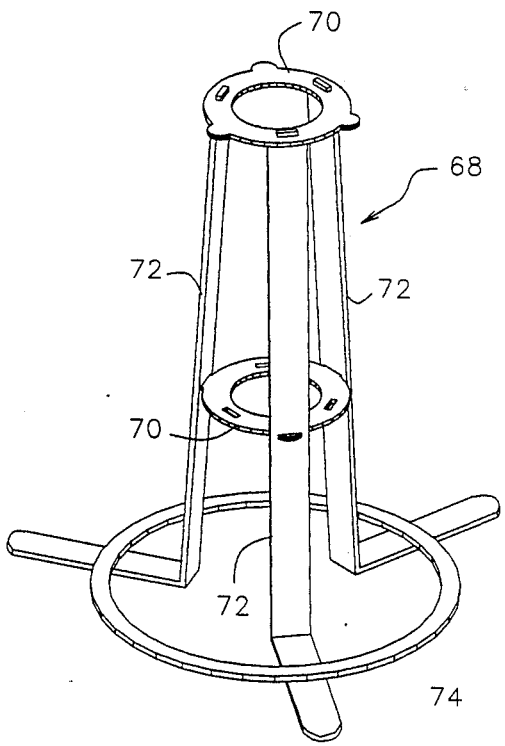
FIG. 15 is a perspective view illustrating the umbrella support stand of the present invention.

With reference to FIG. 13 of the drawings, the leaf keeper disk 20 such as a 16 gage steel brass plated ring includes a plurality of equally spaced holes 64 for attaching, for example, artificial foliage to the umbrella 10. The leaf keeper disk 20 facilitates attachment and removal of foliage thereto so that the user may change the foliage to match the season or to match a different decor if the umbrella is moved from one location to another. The leaf keeper disk 20 also provides for tying down tree branches near the center of the hub and may be accessed by removing the acorn nut 26 and finial 22 14.

Figure 14:
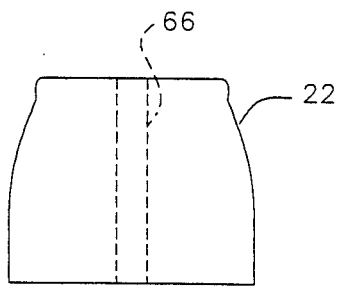
FIG. 14 is an enlarged side elevation of the standard finial.

As shown in FIG. 14 of the drawings, the finial 22 includes a central bore 66 which accommodates the hanger bolt 24. Not only are the leaves interchangeable, but so is the finial 22. The plain knob-like finial shown in the drawings and formed from a material such as wood can be changed to a bird or other suitable ornament. Thus, the umbrella of the present invention lends itself to a whole variety of accessories.

As shown in FIGS. 15-19 of the drawings, an exemplary umbrella stand for supporting the base of the central pole 12 and thereby maintaining the umbrella 10 in the upright position shown in FIG. 2 is made, for example, from 16 gage steel which is brass plated after fabrication. The stand generally depicted by the reference numeral 68 includes a pair of retainer disks 70, three legs 72, and a base disk 74 which is attached to each of the legs by, for example, a bolt, nut and lock washer assembly (not shown). The base disk or ring 74 includes three equally spaced holes 76 (FIG. 16) which align with a hole 78 in each of the legs 72 when the stand 68 is assembled. Each of the retainer disks 70 includes three equally spaced tabs 80 and three equally spaced slots 82 offset with respect to the tabs by 60° (FIG. 17). Each of the stand legs 72 includes an upwardly extending tab 84 and a horizontal slot 86 (FIGS. 18 and 19).

With reference again to FIG. 15 of the drawings, the stand 68 is assembled by placing the upper tab 84 of each leg through a corresponding slot 82 in a first retainer disk 70, placing the tabs 80 of a second retainer disk in the corresponding slots 86 in each of the legs 72, and then attaching the base ring to the lower horizontal section of each of the legs 72. In order to protect the wooden center pole 12 which is made for example from mahogany, while oak, poplar, etc. from damage by hitting against the inner surface of each of the retaining disks 70, a section of PVC pipe (not shown) extending for at least the full height of the stand 68 is inserted through the central opening in each of the retainer disks 70 prior to insertion of the pole 12.

When the stand is used out of doors, for example, in a garden, a plurality of stakes 88 (FIGS. 20 and 21) are used to secure the stand 68. Each stake 88 includes a L-shaped flange 90 which fits over the base disk 74 and provides a flat surface for driving in the stakes 88 in a conventional manner. The stakes 88 are made, for example, of the same material as the stand 68.

Although the stand 68 is shown in the drawings and described for providing support for the pole 12, it is to be understood that a stand need not be used and that the umbrella 10 may be supported, for example, by burying the pole 12 in the ground, in a pot, or by placing the pole 12 in a central opening in a patio or garden table constructed for use with an umbrella.

The plant supporting umbrella 10 of the present invention, serves as a portable arbor which can be installed in a pot and used for supporting climbing shrubs or vines. When covered with real or artificial foliage or a combination of both real and artificial foliage, the umbrella of the present invention serves as a shade umbrella for areas that could not accommodate a beach umbrella. For example, the lattice assemblies or spokes of the umbrella can be adjusted so that it can be placed in a corner or flat up against a wall. The umbrella of the present invention is suitable for indoor or outdoor use. Since the leaf keeper disk and the lattice assemblies provide a plurality of easily accessible tie down locations, the color of foliage attached to the umbrella structure may be changed to accommodate different rooms or settings. Furthermore, the finial may be exchanged with another suitable ornament to match the decor or personal taste of the user.

Even though the umbrella 10 as described above is made of wood and brass components, it is to be understood that it may be constructed of other materials such as plastic, fiberglass, papermache, wire and/or metal. Further, it can be painted or stained and treated with weather resistant varnish.

The arbor-like umbrella 10 of the present invention can be constructed from small sized components so as to provide a miniature arbor for a small garden topiary or can be constructed of large sized components to, for example, cover a large patio table area. In accordance with one example, the umbrella includes a 6' 4" long 1½' diameter center pole, a 11" diameter central hub which is 1½" thick at its center, and 18" long slats which are 1¼" in width and forms a canopy or trellis which is approximately 6' in diameter.

All of the umbrella components excepting the center pole can be easily stored or packaged in a relatively small box, canvas duffle bag, or tin can prior to assembly or following disassembly. If the components are stored in a tin can, the can will serve as a temporary base when weighted with a heavy enough material so that the umbrella can be set up immediately. Further, it is contemplated that the center pole can be formed, for example, of a plurality of telescopic sections so that even the center pole when disassembled may fit into a relatively small sized container.

Further, it will be apparent to those skilled in the art from the foregoing description and accompanying drawings that additional modifications and/or changes may be made, again without departure from the invention. Accordingly, it is expressly intended that the foregoing description and accompanying drawings are illustrative of a preferred embodiment only, not limiting, and that the true spirit and scope of the present invention can be determined by reference to the appended claims.

I claim:

1. An umbrella-like arbor for supporting foliage thereon, comprising:
   a center pole;
   a central support hub atop the center pole; and
   a plurality of lattice assemblies radiating from the support hub essentially in planes which intersect the axis of the center pole at the same large acute angle;
   each of said lattice assemblies comprising an open framework of interconnected slats lying substantially in the planes of said lattice assemblies, respectively; and
   means for rotatably supporting each of said lattice assemblies from said hub on axes generally parallel to the axis of the center pole so that the overall configuration of the arbor may be adapted to a variety of shapes.

2. The arbor of claim 1, wherein each of said lattice assemblies comprises four slats of equal length and pivotally mounted to one another to enable each of said lattice assemblies to assume a multitude of parallelogram configurations.

3. The arbor of claim 2, further comprising:
   a leaf keeper disc having a plurality of openings for attaching foliage near the center of the support hub.

4. The arbor of claim 3, further comprising:
   a ring for reinforcing the support hub in the area of attachment of the lattice assemblies.

5. The arbor of claim 4, further comprising:
   a finial above the support hub and leaf keeper 6. The arbor of claim 5, wherein the support hub, leaf keeper disc, and finial are fastened to the center pole by a bolt means extending through a central through hole in each of the support hub, leaf keeper disc and finial and seated in the top of the center pole.

7. The arbor of claim 6, wherein each of the lattice assemblies are rotatably attached to the support hub by a long bolt assembly which extends through a through hole in the adjacent slats, the support hub, and the reinforcing ring.

8. The arbor of claim 7, wherein each slat of the lattice assemblies is pivotally mounted to an adjacent slat by a short bolt assembly.

9. The arbor of claim 8, further comprising a stand for supporting the lower end of the center pole.

10. The arbor of claim 9, wherein the plurality of lattice assemblies comprises at least five assemblies with each assembly including at least four slats.

* * * * *